United States Patent
Masson et al.

(10) Patent No.: US 8,850,942 B2
(45) Date of Patent: Oct. 7, 2014

(54) PROCESS FOR MANUFACTURING A MECHANICAL MEMBER MADE OF A COMPOSITE HAVING INCREASED MECHANICAL STRENGTH

(75) Inventors: Richard Masson, Les Loges en Josas (FR); Patrick Dunleavy, Palaiseau (FR)

(73) Assignee: Messier-Bugatti-Dowty, Velizy Villacoublay (FR)

( * ) Notice: Subject to any disclaimer, the term of this patent is extended or adjusted under 35 U.S.C. 154(b) by 0 days.

(21) Appl. No.: 13/819,258

(22) PCT Filed: Aug. 30, 2011

(86) PCT No.: PCT/EP2011/064873
§ 371 (c)(1),
(2), (4) Date: Feb. 26, 2013

(87) PCT Pub. No.: WO2012/028599
PCT Pub. Date: Mar. 8, 2012

(65) Prior Publication Data
US 2013/0152772 A1    Jun. 20, 2013

(30) Foreign Application Priority Data
Aug. 31, 2010    (FR) ...................................... 10 56905

(51) Int. Cl.
*D04C 3/48*    (2006.01)
*D04C 1/06*    (2006.01)
*B29C 70/22*    (2006.01)
*B29C 70/32*    (2006.01)
*D04C 1/02*    (2006.01)
*F16C 7/02*    (2006.01)
*B29C 70/48*    (2006.01)

(52) U.S. Cl.
CPC .. *D04C 1/06* (2013.01); *D04C 3/48* (2013.01); *B29C 70/222* (2013.01); *B29C 70/32* (2013.01); *B29C 70/48* (2013.01); *D04C 1/02* (2013.01); *D10B 2403/02411* (2013.01); *D10B 2505/02* (2013.01); *F16C 7/026* (2013.01)
USPC ............................................................ 87/34

(58) Field of Classification Search
USPC .................. 87/8, 9, 11, 34, 41; 623/23.7, 900
See application file for complete search history.

(56) References Cited

U.S. PATENT DOCUMENTS

| | | | | |
|---|---|---|---|---|
| RE35,081 E | * | 11/1995 | Quigley | 428/36.2 |
| 5,619,903 A | * | 4/1997 | Rogers et al. | 87/7 |
| 5,712,010 A | * | 1/1998 | Russek et al. | 428/36.3 |
| 5,899,134 A | * | 5/1999 | Klein et al. | 87/9 |
| 5,979,288 A | * | 11/1999 | Gallagher et al. | 87/36 |
| 7,069,835 B2 | * | 7/2006 | Nishri et al. | 87/11 |

(Continued)

*Primary Examiner* — Shaun R Hurley
(74) *Attorney, Agent, or Firm* — Sughrue Mion, PLLC

(57) ABSTRACT

A method of fabricating a mechanical member for aircraft, including a plurality of operations of braiding and depositing layers of braided reinforcing fibers on a mandrel (11) by using braiding machine. Each operation comprises braiding a braided layer and depositing it by moving the mandrel (11) along a central axis of the braiding machine. Each of the various superposed braided layers comprises both longitudinal fibers (12, 12G) that are parallel to a main direction of the mandrel (11), and interlacing fibers that are inclined. At least one operation is configured to form and deposit a braided layer having, in at least one cross-section of the member, a density of longitudinal fibers that differs depending on whether consideration is given to one angular region (S1) or another angular region (S2) of the same extent around the center of gravity (G) of the mandrel (11) in the section under consideration.

4 Claims, 4 Drawing Sheets

(56) References Cited

U.S. PATENT DOCUMENTS

| | | | |
|---|---|---|---|
| 8,006,601 B2* | 8/2011 | Inazawa et al. | 87/1 |
| 2004/0237760 A1* | 12/2004 | Shimizu | 87/34 |
| 2006/0130642 A1* | 6/2006 | Tomich et al. | 87/9 |
| 2008/0229921 A1* | 9/2008 | Head et al. | 87/20 |
| 2009/0275974 A1* | 11/2009 | Marchand et al. | 606/194 |
| 2010/0274282 A1* | 10/2010 | Olson | 606/228 |

* cited by examiner

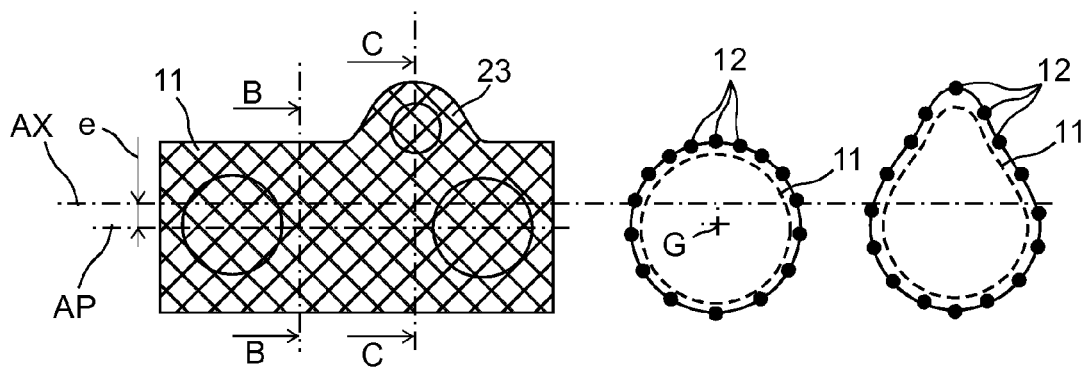
FIG. 10A  FIG. 10B  FIG. 10C
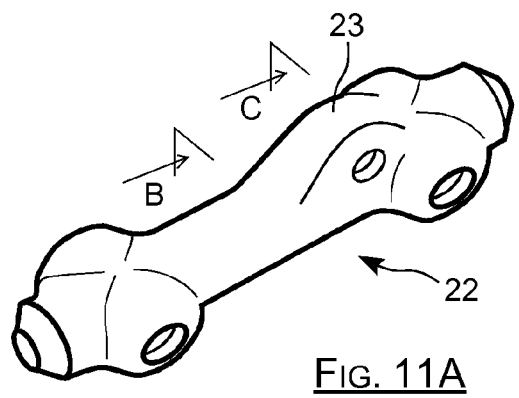
FIG. 11A
FIG. 11B  FIG. 11C

PROCESS FOR MANUFACTURING A MECHANICAL MEMBER MADE OF A COMPOSITE HAVING INCREASED MECHANICAL STRENGTH

CROSS REFERENCE TO RELATED APPLICATIONS

This application is a National Stage of International Application No. PCT/EP2011/064873 filed Aug. 30, 2011, claiming priority based on French Patent Application No. 10 56905 filed Aug. 31, 2010, the contents of all of which are incorporated herein by reference in their entirety.

The invention relates to a method of using composite material to fabricate a mechanical member such as a rod for an aircraft landing gear strut.

BACKGROUND OF THE INVENTION

It is known, in particular from patent document FR 2 932 409, to fabricate such a rod by using a mandrel on which one or more layers of carbon fibers are braided in radial superposition on one another.

That assembly is then installed in a mold in order to inject resin into the various layers carried by the mandrel prior to polymerizing the resin, e.g. by heating it, thereby constituting a rigid blank for a rod, which blank can be machined at its interfaces in order to form lugs therein.

The braiding of the layers of reinforcing fibers is then performed with a braiding installation as shown in FIG. 1, where it is referenced 1. The installation essentially comprises a ring 2 extending in a vertical plane, with the central axis AX of the ring thus being horizontal. The ring 2 carries a set of reels 3 carrying reinforcing fibers, the fibers converging on a region that is situated on the axis AX and that is offset from the plane of the ring.

When the braiding cycle is started, the mandrel, referenced 4, is moved along the central axis AX so as to pass through the ring 2 beyond the point where the fibers converge. Simultaneously, the reels carried on the ring 2 by motor-driven movable supports are actuated so as to reel out fibers in order to fabricate a sock of reinforcing fibers on the outside face of the mandrel 4.

Once the mandrel has passed right through the ring, i.e. once it is situated beyond the fiber convergence point, it is covered over its entire length by the sock.

The layer of reinforcing fibers is then cut between the mandrel and the ring, and the mandrel is removed and then put back behind the ring in order to pass through it once more so as to form a second layer of reinforcing fibers that is superposed radially on the first.

Thus, as shown diagrammatically in FIG. 2, it is possible to fabricate a general structure comprising the mandrel in its central region, which mandrel forms a support for two or more layers of braided fibers 6, 7 that extend all around the mandrel, over its entire length.

Specifically, as shown in FIG. 3, a braided layer comprises firstly interlacing fibers 8 and 9 that are inclined, e.g. at about 30°, on either side of the axis AX, and secondly longitudinal fibers 10 that are parallel to the axis AX, and that are held in position by the interlacing fibers 8 and 9 that interlace them.

In practice, and as can be seen in FIG. 3, each layer of braided fibers is made up of a plurality of sublayers, levels, or thickness, each comprising a series of longitudinal fibers 10 situated beside one another in a comb arrangement. The interlacing fibers 8, 9 interlace the longitudinal fibers 10 of the various sublayers together so as to form a coherent whole.

When the layers of braided fibers have been applied on the mandrel, the longitudinal fibers 10 of each sublayer are distributed uniformly about the mandrel 4 that carries them, i.e. they are regularly spaced apart from one another around the mandrel 4, as shown diagrammatically in FIG. 4.

In service, such a mechanical member is subjected to mechanical loading circumstances that are relatively complex, and as a result it is subjected to stresses that differ from one region of the member to another.

With a member fabricated by braiding, that situation leads to selecting the thickness of reinforcing fibers for depositing over the entire mandrel as a function of the maximum stress to which the member is to be subjected, even though the maximum stress actually corresponds only to a particular region of the member under consideration.

It follows that in many of its zones, the member is thus overdimensioned, thereby pointlessly penalizing the total weight of the member.

OBJECT OF THE INVENTION

The object of the invention is to propose a solution for remedying that drawback.

SUMMARY OF THE INVENTION

To this end, the invention provides a method of fabricating a mechanical member made of composite material, the method comprising a plurality of operations of braiding and depositing layers of braided reinforcing fibers by means of a braiding machine, each operation comprising braiding a layer of reinforcing fibers and depositing it on a mandrel by moving the mandrel along a central axis of the braiding machine, the various layers of braided fibers being superposed radially on one another, each layer of braided fibers having both longitudinal fibers extending parallel to a main direction of the mandrel, and also interlacing fibers that are inclined relative to the main direction, the method being characterized in that at least one braiding and deposition operation is configured to form and deposit a braid that presents, in at least one cross-section of the member, a density of longitudinal fibers that differs depending on whether consideration is given to a first angular region around the center of gravity of the mandrel in said cross-section or to a second angular region of the same extent around the center of gravity.

With this solution, the mechanical member presents greater thickness in an entire portion that extends over its entire length, and smaller thickness in the opposite portion.

The invention also provides a method as defined above, including at least one operation of braiding and depositing a layer of braided fibers that is performed to constitute a layer of braided fibers having longitudinal fibers of different sizes, and including longitudinal fibers of large size situated in a first region of the braided layer and longitudinal fibers of small size situated in a second region of the braided fiber.

The invention also provides a method as defined above, wherein a braiding machine is used having a braiding ring carrying reels of longitudinal fibers arranged in such a manner that each layer of braided fibers is made up of a plurality of superposed sublayers, each including a series of longitudinal fibers in a comb arrangement, wherein one region of the ring is loaded with reels of large-size longitudinal fibers and another region of the ring is loaded with reels of small-size longitudinal fibers, and wherein the proportion of reels carrying large-size fibers and of reels carrying small-size fibers varies gradually from one region of the ring to another.

The invention also provides a method as defined above, including at least one operation of braiding and depositing a layer of braided fibers, wherein the mandrel is positioned to have its main axis radially offset relative to the central axis of the braiding machine while the mandrel is being moved along the central axis of the braiding machine, so as to braid and deposit a layer of braided fibers presenting a quantity of longitudinal fibers that is greater in a first region that is closer to the central axis of the braiding machine than in a second region that is farther from the central axis of the braiding machine.

The invention also provides a method as defined above, wherein the provision of longitudinal fibers having different sizes is combined with a radial offset of the main axis of the mandrel relative to the central axis of the braiding machine.

BRIEF DESCRIPTION OF THE FIGURES

FIG. 10A is a diagrammatic side view showing an axial offset performed in the braiding operation in accordance with the second implementation of the invention in order to fabricate a rod including an off-center intermediate lug;

FIG. 10B is a diagrammatic view in a first cross-section plane of the FIG. 10A rod showing its mandrel and the longitudinal fibers of one of the sublayers of the braided layers carried by the mandrel;

FIG. 10C is a diagrammatic view in a second cross-section plane of the FIG. 10A rod showing its mandrel and the longitudinal fibers of one of the sublayers of the various braided layers carried by the mandrel;

FIG. 11A is a perspective view of a rod having an eccentric intermediate lug that may advantageously be fabricated in accordance with the method of the invention;

FIG. 11B is a first cross-section view of the FIG. 1A rod; and

FIG. 11C is a second cross-section view of the FIG. 11A rod.

DETAILED DESCRIPTION OF THE INVENTION

The idea on which the invention is based is to form and deposit on a mandrel layers of reinforcing fibers that are braided in such a manner that the longitudinal fibers of the layers present density that is greater on one side of the mandrel than on the other.

Figure 1:
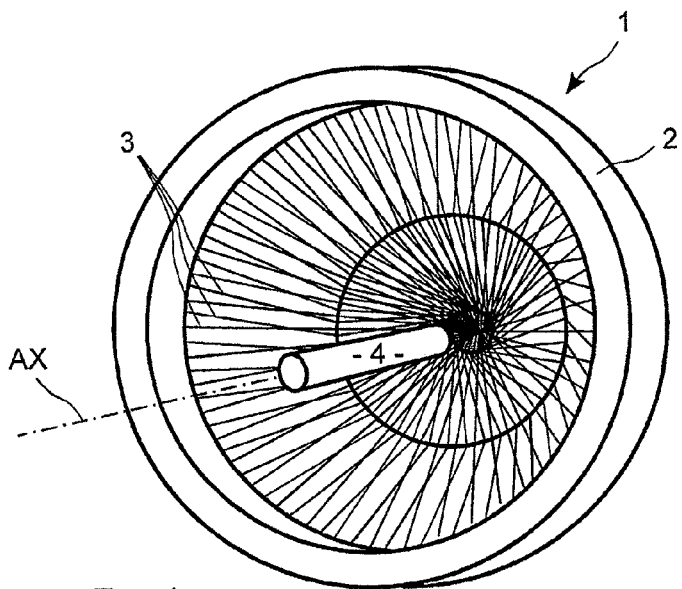
FIG. 1 is a diagrammatic perspective view of a braiding machine with a mandrel that is to receive a layer of braided fibers.
Figure 2:
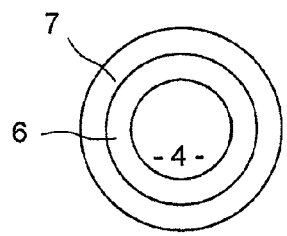
FIG. 2 is a diagrammatic cross-section view showing the layers making up a prior art rod of composite material.
Figure 3:
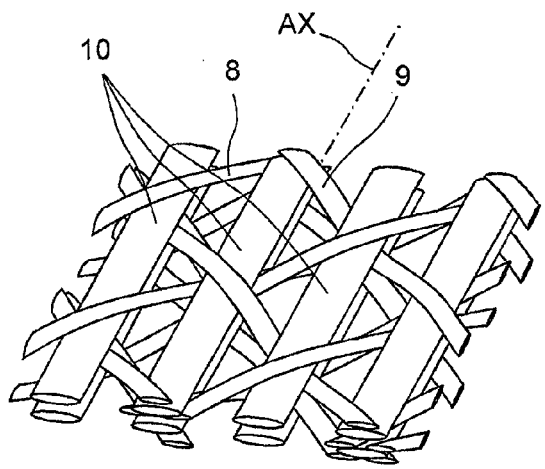
FIG. 3 is a diagrammatic perspective view showing a portion of braided reinforcing fibers made up of two sublayers.
Figure 4:
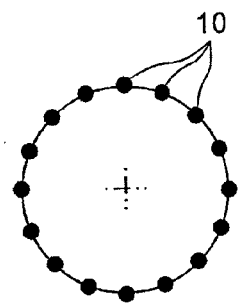
FIG. 4 is a diagrammatic cross-section view showing the longitudinal fibers of a sublayer forming part of a braided layer in a prior art rod.
Figure 5:
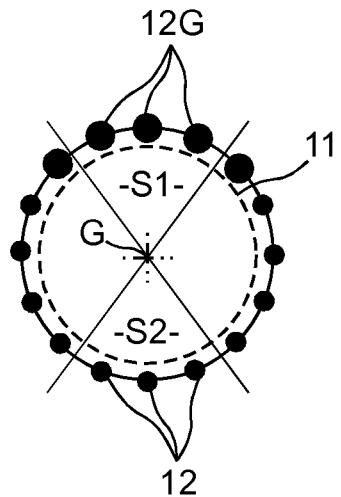
FIG. 5 is a diagrammatic cross-section view showing the longitudinal fibers in a sublayer of a braided layer in a rod obtained in accordance with a first implementation of the invention.

This may be achieved by providing longitudinal fibers in one region that are of greater size than the longitudinal fibers in another region of the braided layer, where this corresponds to a first implementation as shown in FIG. 5. This may also be achieved by using longitudinal fibers that are all of the same size, but by placing them in greater quantity in one region than in another region of the layer of reinforcing fibers, with this corresponding to a second implementation shown in FIG. 6.

Figure 6:
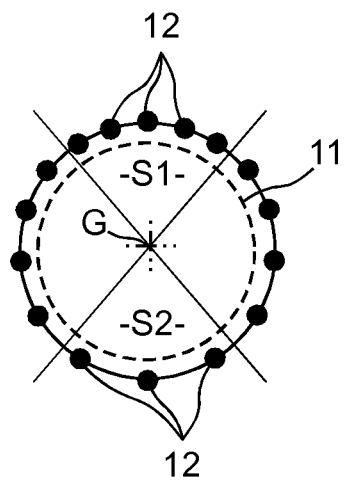
FIG. 6 is a diagrammatic cross-section view showing the longitudinal fibers in a sublayer of a braided layer in a rod obtained in accordance with a second implementation of the invention.

In order to illustrate the density difference, FIGS. 5 and 6 thus show two angular regions or sectors S1 and S2 having the same angular extent, both centered on the center of gravity G of a cross-section of the mandrel 11 of the fabricated member, and arranged in such a manner as to be opposite each other. The region S1 is situated in the top portion of the member while the region S2 is situated in the bottom portion of the member.

In the configuration of FIG. 5, each of the regions S1 and S2 has three longitudinal fibers, however the longitudinal fibers 12G included in the top region S1 are each of greater section than the longitudinal fibers 12 included in the bottom region S2. Thus, the density of longitudinal fibers is significantly greater in the top region than in the bottom region because the fibers in the top region are of section that is greater than the section of the fibers in the bottom region.

In the configuration of FIG. 6, the longitudinal fibers 12 are all of the same size, i.e. of the same section, but the top region S1 has five of them, whereas the bottom region S2 has only three. In this configuration also, the density of longitudinal fibers is greater in the sector S1 than in the sector S2, because the number of fibers in the top region is greater than the number of fibers in the bottom region.

Figure 7:
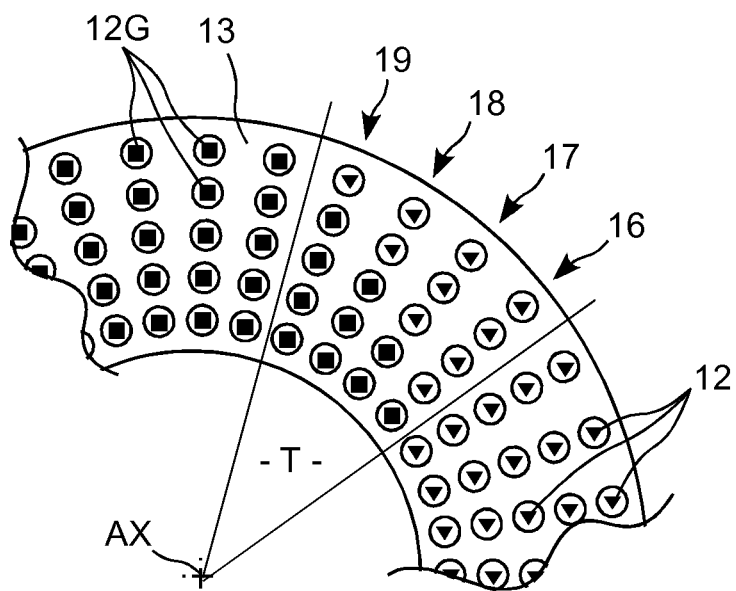
FIG. 7 is a diagrammatic view of a portion of a ring of a braiding machine arranged to form a braid having longitudinal fibers of different sizes in accordance with the first implementation of the invention.

In the first implementation of the invention, the reels of the large-size longitudinal fibers 12G are placed in the top portion of the ring 13 of the braiding machine shown in part in FIG. 7, and the reels of the smaller-size longitudinal fibers 12 are placed in the remainder of the ring.

In FIG. 7, the reels of the large-size longitudinal fibers 12G are represented by squares, whereas the reels of the smaller-size longitudinal fibers 12 are represented by triangles.

As mentioned above, each layer of braided fibers is made up of a plurality of thicknesses or sub-thicknesses, each including a series of longitudinal fibers in a comb arrangement, i.e. arranged side by side. In the example of FIG. 7, the ring 13 includes, for this purpose, five concentric annuluses of reinforcing fiber reels that are spaced apart radially from one another relative to the central axis AX so as to form a layer of braided fibers that is made up of five sublayers.

In order to avoid having too great a change of thickness in the transition region between the fine longitudinal fibers 12 and the thick longitudinal fibers 12G, it is advantageous to provide a particular distribution of the various reels on the ring of the braiding machine.

Specifically, and as shown in FIG. 7, the reels are arranged on the annulus 13 in radial columns, each having five reels. A transition zone is provided that is situated in the angular sector referenced T in FIG. 7, which sector lies between the bottom region of the ring 13 in which each of the radial columns has five reels of small-size longitudinal fibers and the top region of the ring in which each of the radial columns has five reels of large-size reinforcing fibers.

In this transition zone T there are four radial columns of reels referenced 16 to 19. The first radial column 16 of reels has one reel of large-section longitudinal fibers followed by four reels of small-section fibers, this first column being adjacent to a column of the bottom portion, i.e. a column having only reels of small-size fibers.

The second column 17, adjacent to the first, has two reels of large-section longitudinal fibers followed by three reels of small-section longitudinal fibers. The third column 18, adjacent to the second, has three reels of large-section fibers followed by two reels of small-section fibers.

The fourth column 19, adjacent to the third has four reels of large-section fibers and only one reel of small-section fibers, and this fourth column is adjacent to a column of the top region of the ring, i.e. a column having five reels of large-size fibers.

This transition zone T ensures that the increase in the thickness of the layer of braided reinforcing fibers is gradual instead of being sudden, which contributes to obtaining a uniform level of tension during braiding for all of the fibers in the braided layer.

It will thus be understood that fabricating a mechanical member in accordance with the first implementation consists in equipping the braiding machine with longitudinal fibers of large size and with longitudinal fibers of small size, as described above with reference to FIG. 7.

A mandrel is then installed on the central axis AX of the braiding machine, the mandrel being arranged concentrically on this axis. The mandrel is then moved along the central axis while simultaneously the braiding machine is activated to form the braid of reinforcing fibers in a convergence zone of the fibers that is situated substantially on the central axis AX while being spaced apart from the ring 13. The main function of the mandrel 11 is to support the various braided layers, or "preforms", and to define the inside shape of the part.

Once the mandrel has passed through the reinforcing fiber convergence zone, it carries a layer of braided fibers. The layer may then be cut between the mandrel and the ring, prior to reinstalling the mandrel at the entrance of the ring 13 on the axis AX so as to move it once more along the axis in order to form and deposit a new layer of reinforcing fibers on the first braided layer.

Analogous steps are performed to form a predetermined number of reinforcing fiber layers that are radially superposed on one another on the mandrel, which is typically a generally tubular hollow part.

Once all of these layers have been deposited, the resulting element presents a thickness in its top region that is significantly greater than the thickness that it presents in its bottom region, with the difference in thickness corresponding to a difference in longitudinal fiber density.

The assembly is then placed in a mold in order to inject resin into the various deposited layers, prior to triggering a heating cycle for polymerizing the resin. The blank that is obtained at this stage is subsequently machined to form a finished part.

In the second implementation of the invention, the increase in the density of longitudinal fibers in the top region of each layer of braided fibers is obtained by offsetting the mandrel 11 radially relative to the central axis AX of the braiding machine along which the mandrel is moved in order to form and deposit the layers of braided fibers.

Figures 8A, 8B:
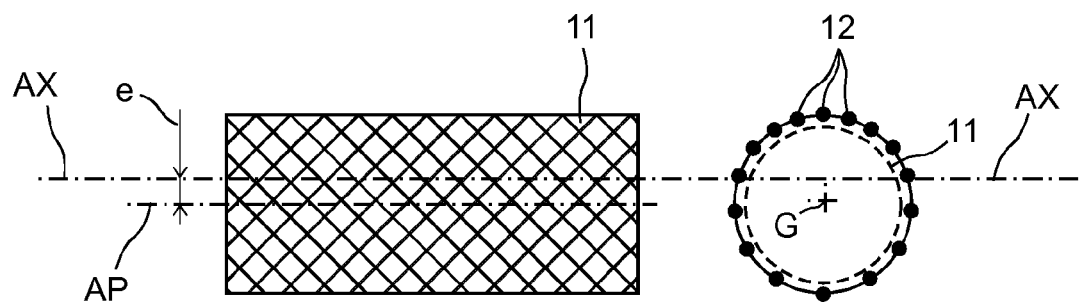
FIG. 8A is a diagrammatic side view showing an axial offset performed in the braiding operation in accordance with the second implementation of the invention.
FIG. 8B is a diagrammatic view in a cross-section plane of the FIG. 8A rod showing the mandrel together with the longitudinal fibers of one of the sublayers of the various braided layers carried by the mandrel.

As shown diagrammatically in FIGS. 8A and 8B, the main axis AP of the mandrel is thus offset downwards relative to the central axis AX of the braiding machine, by an offset value written e.

In general manner, the main axis AP of the mandrel 11 corresponds to the axis defined by the centers of gravity of two cross-sections of the mandrel situated in a portion of the mandrel that corresponds to the body of the fabricated member, i.e. to a regular portion of the mandrel, such as its tubular portion.

Forming and depositing a layer of reinforcing fibers in accordance with this second implementation of the invention thus consists in moving the mandrel along the axis AX of the braiding machine while keeping it offset downwards relative to said axis AX.

Under such conditions, when the mandrel 11 reaches the fiber convergence zone, it is offset downwards relative thereto so that the braid that is formed progressively as the mandrel 11 advances through this convergence zone has a larger quantity of longitudinal fibers in its top region than in its bottom region, as shown diagrammatically in FIG. 8B.

Once the mandrel has passed right through the convergence zone, the fiber braid is cut between the mandrel and the ring. The mandrel is then returned to the entrance of the ring so as to form and deposit a new layer of reinforcing fibers.

As in the first implementation, once the predefined number of braided fiber layers has been deposited on the mandrel, the assembly is placed in a mold for resin to be injected and polymerized, prior to being machined in order to form a finished part.

Figure 9:
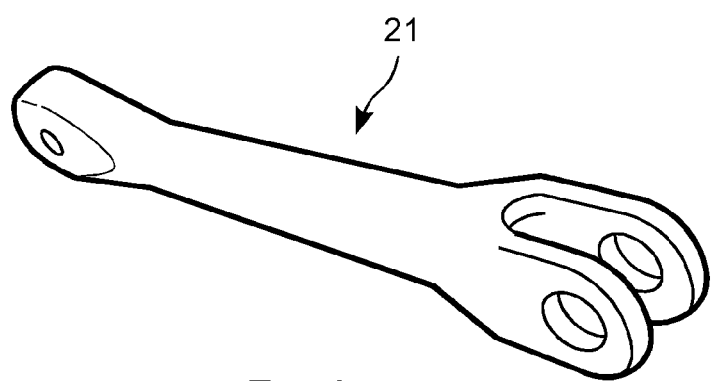
FIG. 9 is a perspective view of a first example of a rod suitable for being fabricated in accordance with the method of the invention.

In both its first and second implementations, the invention makes it possible to fabricate simple rods such as the rod 21 of FIG. 9 comprising a generally tubular main body and presenting ends, each provided with at least one lug.

However the invention is also applicable to fabricating mechanical members of more complex shape, such as for example the rod 22 shown in FIG. 11, having a central body that is generally tubular with a lug at each end, but also having an intermediate lug. This intermediate lug is referenced 23 and is situated between its ends, and it extends radially relative to the main axis AP of the rod.

The rod 22 may be fabricated in accordance with the second implementation of the invention, i.e. by fitting the braiding machine with longitudinal fibers, all having the same size, but with the mandrel 11 being offset away from the central axis AX of the braiding machine.

In practice, the mandrel 11 is then positioned to offset its main axis AP relative to the axis AX so as to bring the intermediate lug 23 closer to the central axis AX, as shown in FIG. 10A.

Thereafter, the mandrel 11 is moved through the braiding machine along the axis AX while conserving this offset e so as to form and deposit thereon a braid of reinforcing fibers.

Once the mandrel has gone past the reinforcing fiber convergence point, the fibers are cut between the mandrel and the ring of the braiding machine. The mandrel is then returned to the entrance of the braiding machine, still with the radial offset e, and it is then moved along the axis AX in order to form and deposit another layer of reinforcing fibers.

Thus, and as shown diagrammatically in FIG. 10B, in an ordinary cross-section of the rod, i.e. in a portion of its main body that is tubular in shape, the quantity of reinforcing fibers is greater in the top portion than in the bottom portion.

In the region corresponding to the intermediate lug 23, shown in cross-section in FIG. 10C, the reinforcing fibers are distributed uniformly over this lug and they are present in sufficient quantity to confer appropriate mechanical strength on the lug, even though it constitutes a projection extending radially from the body of the rod.

The value e of the offset may thus be adjusted so that the quantity of longitudinal fibers in the top portion is greater than in the bottom portion in the ordinary section of the rod and also in the intermediate lug 23.

This adjustment corresponds to a rod of the kind shown in FIG. 11A, which presents a greater thickness of fibers in its top region in its ordinary section as shown in FIG. 11B and also in its section through the intermediate lug 23, as shown in FIG. 11C.

In analogous manner, the rod 23 of FIG. 11 may also be fabricated using the first implementation of the invention, i.e. by fitting the top portion of the ring of the braiding machine with fibers of size that is greater than that of the other fibers, and without offsetting the mandrel relative to the central axis AX while forming and depositing layers of reinforcing fibers.

In the above-described examples, two implementations of the invention are described separately, i.e. firstly the possibility of loading the ring of the braiding machine with fibers of different size, and secondly the possibility of radially offsetting the mandrel relative to the axis of the braiding machine in order to obtain densities of longitudinal fibers that differ between one region and another region in each braided layer.

It should be observed that both of those approaches that are described separately above can advantageously be used in combination. For example, it is possible to load the ring of the braiding machine with longitudinal fibers of large size in the top region and with longitudinal fibers of normal size in the other regions, and also to offset the mandrel relative to the axis of the braiding machine so as to obtain an even greater difference in reinforcing fiber density.

The invention provides the following advantages in particular:

In general, the invention makes it possible to vary the thickness of material so as to reinforce and thicken zones that are subjected to greater stresses, thus making it possible to fabricate a high performance structural part at a competitive production cost.

This fabrication technique is particularly adapted to rocker type parts, i.e. to parts that are subjected to "three point" bending. Specifically, these parts are subjected to mechanical stresses that seek to bend them always in the same direction.

By way of example, for downward bending, the bottom portion of the part is stressed in traction, whereas its top portion is stressed in compression. The traction and compression stresses are of substantially the same value, but the material of the fibers generally presents compression strength that is less than its traction strength. Consequently, it is appropriate to reinforce the part in its top portion, since that is where it is subjected to compression stress, but not in its bottom portion where it is stressed in traction only.

The invention claimed is:

1. A method of fabricating a mechanical member (21, 22) made of composite material, the method comprising a plurality of operations of braiding and depositing layers of braided reinforcing fibers by means of a braiding machine, each operation comprising braiding a layer of reinforcing fibers and depositing it on a mandrel (11) by moving the mandrel (11) along a central axis (AX) of the braiding machine, the various layers of braided fibers being superposed radially on one another, each layer of braided fibers having both longitudinal fibers (12, 12G) extending parallel to a main direction (AP) of the mandrel (11), and also interlacing fibers that are inclined relative to the main direction (AP), the method being characterized in that at least one braiding and deposition operation is configured to form and deposit a braid that presents, in at least one cross-section of the member (21, 22), a density of longitudinal fibers (12, 12G) that differs depending on whether consideration is given to a first angular region (S1) around the center of gravity (G) of the mandrel (11) in said cross-section or to a second angular region (S2) of the same extent around the center of gravity (G), wherein at least one operation of braiding and depositing a layer of braided fibers is performed to constitute a layer of braided fibers having longitudinal fibers (12, 12G) of different sizes, and wherein longitudinal fibers of large size (12G) are situated in a first region (S1) of the braided layer and longitudinal fibers of small size are situated in a second region (S2) of the braided fiber.

2. A method according to claim 1, wherein a braiding machine is used having a braiding ring (13) carrying reels of longitudinal fibers (12, 12G) arranged in such a manner that each layer of braided fibers is made up of a plurality of superposed sublayers, each including a series of longitudinal fibers (12, 12G) in a comb arrangement, wherein one region of the ring (13) is loaded with reels of large-size longitudinal fibers (12G) and another region of the ring (13) is loaded with reels of small-size longitudinal fibers (12), and wherein the proportion of reels carrying large-size fibers (12G) and of reels carrying small-size fibers (12) varies gradually from one region of the ring to another.

3. A method of fabricating a mechanical member (21, 22) made of composite material, the method comprising a plurality of operations of braiding and depositing layers of braided reinforcing fibers by means of a braiding machine, each operation comprising braiding a layer of reinforcing fibers and depositing it on a mandrel (11) by moving the mandrel (11) along a central axis (AX) of the braiding machine, the various layers of braided fibers being superposed radially on one another, each layer of braided fibers having both longitudinal fibers (12, 12G) extending parallel to a main direction (AP) of the mandrel (11), and also interlacing fibers that are inclined relative to the main direction (AP), the method being characterized in that at least one braiding and deposition operation is configured to form and deposit a braid that presents, in at least one cross-section of the member (21, 22), a density of longitudinal fibers (12, 12G) that differs depending on whether consideration is given to a first angular region (S1) around the center of gravity (G) of the mandrel (11) in said cross-section or to a second angular region (S2) of the same extent around the center of gravity (G), including at least one operation of braiding and depositing a layer of braided fibers, wherein the mandrel (11) is positioned to have its main axis (AP) radially offset (e) relative to the central axis (AX) of the braiding machine while the mandrel (11) is being moved along the central axis (AX) of the braiding machine, so as to braid and deposit a layer of braided fibers presenting a quantity of longitudinal fibers (12) that is greater in a first region (S1) that is closer to the central axis (AX) of the braiding machine than in a second region that is farther from the central axis (AX) of the braiding machine.

4. A method according to claim 1, wherein the provision of longitudinal fibers (12, 12G) having different sizes is combined with a radial offset of the main axis (AP) of the mandrel (11) relative to the central axis (AX) of the braiding machine.

* * * * *